United States Patent [19]

Mahar

[11] Patent Number: 5,418,965
[45] Date of Patent: May 23, 1995

[54] SUBROUTINE-TYPE COMPUTER PROGRAM FOR ENHANCING THE SPEED OF DATA PROCESSING IN DATA MANAGEMENT PROGRAMS SYSTEMS

[76] Inventor: Robert C. Mahar, P.O. Box 'B', Pennsburg, Pa. 18073

[21] Appl. No.: 55,919

[22] Filed: Apr. 29, 1993

Related U.S. Application Data

[63] Continuation of Ser. No. 210,819, Jun. 24, 1988, abandoned.

[51] Int. Cl.$^6$ .................. G06F 9/44; G06F 12/06
[52] U.S. Cl. ...................... 395/700; 395/250; 395/275; 395/425; 395/600; 364/DIG. 1
[58] Field of Search ............ 395/275, 375, 425, 700, 395/250, 600

[56] References Cited

U.S. PATENT DOCUMENTS

| | | |
|---|---|---|
| 3,815,103 | 6/1974 | Holtey et al. . |
| 3,938,096 | 2/1976 | Brown et al. . |
| 4,064,553 | 12/1977 | Kashio . |
| 4,130,867 | 12/1978 | Bachman et al. . |
| 4,245,303 | 1/1981 | Durvasula et al. . |
| 4,399,503 | 8/1983 | Hawley ........................ 395/325 |
| 4,447,874 | 5/1984 | Bradley et al. . |
| 4,476,528 | 10/1984 | Matsumoto et al. ............ 395/425 |
| 4,489,378 | 12/1984 | Dixon et al. .................. 395/425 |
| 4,504,907 | 3/1985 | Manning . |
| 4,592,011 | 5/1986 | Mantellina et al. . |
| 4,611,280 | 9/1986 | Lindermann . |
| 4,616,364 | 10/1986 | Lee ............................... 375/1 |
| 4,642,763 | 2/1987 | Cummins . |
| 4,644,463 | 2/1987 | Hotchkin et al. . |
| 4,819,154 | 4/1989 | Stiffler et al. . |
| 4,901,223 | 2/1990 | Rhyne . |
| 5,155,835 | 10/1992 | Belsan ............................ 395/425 |

FOREIGN PATENT DOCUMENTS 0221358  5/1987  European Pat. Off. .

OTHER PUBLICATIONS

Ramdisk Eternal Source Assembler—compuserve uploaded 28-Jun.-87.
User manual of Thunder, p. 3, 1986.

*Primary Examiner*—Ken S. Kim
*Attorney, Agent, or Firm*—Charles A. Wilkinson

[57] ABSTRACT

Processing of data in a higher language database management system is speed enhanced by the use of an external utility or subprogram which determines the amount of free memory available in working memory and selects a plurality of consecutive records from mass memory files which are then transferred as a file unit into a virtual record storage buffer in the working memory leaving just sufficient free working memory to accomplish required processing. The data in the records in the virtual record storage buffer is then continuously processed in the normal manner but without any time consuming intermediate selection of records. In improved versions of the method, the records are read initially into a primary buffer and process records are output through a secondary buffer which is desirably the same as the primary buffer. The utility is written in assembly language for additional speed.

7 Claims, 5 Drawing Sheets

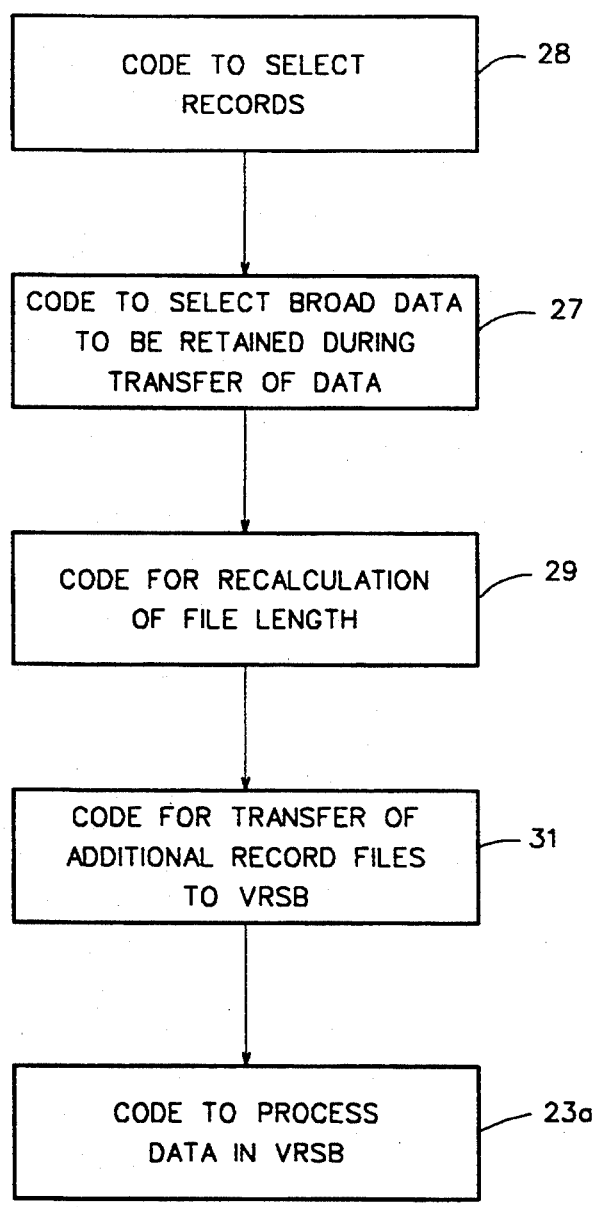

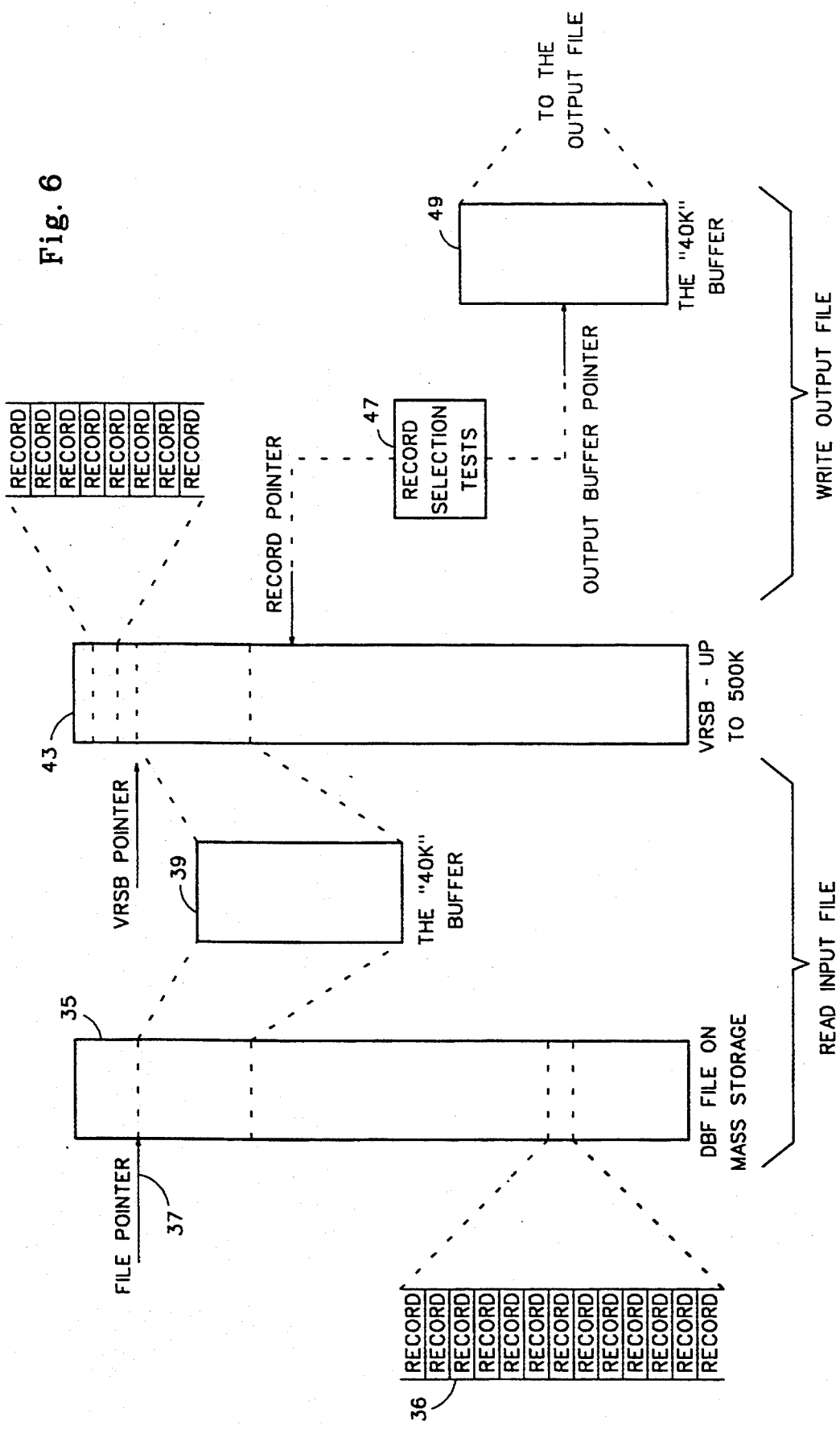

SUBROUTINE-TYPE COMPUTER PROGRAM FOR ENHANCING THE SPEED OF DATA PROCESSING IN DATA MANAGEMENT PROGRAMS SYSTEMS

This application is a continuation of application Ser. No. 07/210,819, filed Jun. 24, 1988, now abandoned.

BACKGROUND OF THE INVENTION (1) Field of the Invention

This invention relates to records processing and more particularly to processing records held in the memory files of a digital computer.

(2) Description of the Prior Art

Businessmen and establishments in particular have a very active need to keep detailed records of customers, suppliers, parts, equipment and literally myriads of other matters and items. Such records in the past were kept in card files and the like where they could be inspected one at a time in sequence or in some other predetermined order such as alphabetical order, numerical order and the like. Specific items of information could be arranged on certain portions of such cards to facilitate an orderly search through a large collection or batch of cards in sequence to locate a specific bit or item of information. In later systems, the file data was entered upon punched cards by means of an appropriate punch code. The appropriate cards containing certain information could then be found by sorting through such punched cards with appropriate means which in one way or another would detect the holes or openings in the cards and remove or segregate the cards having the appropriate holes. It obviously would take a significant time to sort through stacks of cards even when done by automatic mechanical or optical-mechanical sorting means.

More recently, with the advent of digital electronic computers, data has been filed either in the memory of the central processing unit (CPU) or in peripheral or mass memory devices such as magnetic recording tapes, disks and the like. A great number of digital computer programs have been developed to handle such masses or files of data in digital computer apparatus. While such computer programs have been written and used in almost all the basic computer languages such as, for example, BASIC itself, FORTRAN, COBOL and other higher level digital computer languages, most have not been designed especially for the efficient handling of file data and consequently special computer languages have been developed especially adapted for the handling of large amounts of file-type data. One widely used example is so called dBASE and its elaborations dBASE II, dBASE III, dBASE III Plus, etc., which have been widely marketed by the Ashton-Tate Company especially for handling masses of file data expeditiously and efficiently. Such programs can be referred to as database management programs which allow the user to manipulate the information to obtain reports and printouts with various desired combinations of the data. While every higher level programming language has some method or other for filing information and later retrieving it, database management languages such as the dBASE languages are particularly designed to make such task easy and efficient.

Even with the great speed of computers, however, and the use of special languages developed for expeditious database management, when there are large masses of data to be sorted through, or processed, which processing constitutes the pre-eminent function of a database management system, a great deal of time may be expended in aggregate in sorting or processing through such data. For example, even if one record of a database can be examined for pertinent data in a fraction of a second, the consecutive examination of thousands of records can take a number of hours. Since many large business databases, therefore, may contain thousands and tens of thousands of records, it is not unusual for one complete examination of such databases to take upwards of five or six hours or more to complete. Such lengthy periods are expensive both in machine or computer time and in operator time, particularly as the operator usually has little to do during the sorting. The CPU is also largely unavailable during such periods for other tasks and in fact, full scale sorting is frequently conducted during off-hours to avoid, as much as possible, interference with other tasks. Normally the individual records of the database are transferred from storage memory devices to the working memory of the computer one at a time and processed for data whereupon the record is transferred back to the storage means for the working memory and the next record is retrieved for processing.

The previously available programs provide rather intricate systems for the user to access the information in the system. Such system, or "user interface", can take the form of a menu, a question and answer dialogue, various displays and the like. The true value, however, is always basically how fast the system can process the data contained and output such data in a desired usable form. Programs such as the Ashton-Tate dBASE programs offer program language through which a skilled programmer can create, to a limited extent, his or her own interface. However, the actual, processing of data through the program may not be very fast and in fact, it is not infrequent with modern computers that only a limited use is made by the program of the computer's actual capabilities.

The dBASE language and most other database programming packages use random access files to store their information. The random access technique allows the user, via the user interface, to recall a single record at random from among thousands without waiting very long. In contrast, with sequential file access, which is basically like a magnetic tape, regardless of its actual memory storage mode, it is very hard to go to a specific part of the records on the tape without rewinding the tape to the part you want. Random access allows speedy access to all records irrespective of the location of the record in the file. Sequential database management systems usually read the entire file possibly composed of thousands of records, into memory. Once in memory, the file is processed and the database package then rewrites the entire file. This technique wastes time if you want only to access one record and also limits database size to that of the available computer working memory. To change one record on such a system could often take hours.

Random file or data access has the advantage of speedy access to individual records, low memory requirements, and ease in maintaining the database. But, since the system is built around accessing only one record at a time, performing operations on many records wastes considerable time and with modern high capacity computers is a waste of the computer's capabilities.

The operating system (OS) of a computer is the set of more or less standard routines, more or less built into the computer and accessible to the operator to the programmer for performing certain functions. These routines provide the programmer a more or less standard environment in which to work so that the program can work or be used in all computers that use the same operating system or OS even though different hardware, storage devices, display devices and the like may be used. Each OS, however, has what is sometimes referred to as "overhead". This is essentially time taken for each operation. If an operation has to be performed a number of times, the overhead for this particular operation of the operating system is a multiple of the single operation time. Random access operating systems have a relatively high overhead for random access which is particularly detrimental in database management systems or programs where large amounts of data are stored and processed in the form of a large number of individual records. Such overhead is responsible, in large part, for the long periods frequently required even by the most modern computers to process records using the popular database management systems.

There has been a need, therefore, for faster sorting or processing of databases in database management systems in general, and, in particular, in the popular database systems such as dBASE and other higher level database languages.

TERMINOLOGY CONVENTIONS (GLOSSARY)

The following terminology conventions are generally used in the following description and discussions of the invention:

FILE HEADER—a record located usually at the beginning of a database file and preceeding the actual records maintained in the file. Various dBASE databases make use of such records. However, other database systems may have a separate file dedicated to such information.

EXTERNAL UTILITY or PROGRAM—a program or subprogram in itself, usually an add-on program for performing a special function or series of functions. The invention of this application is in the nature of an external utility or program.

FIELD—a single piece of information such as a name or date that is composed of characters. For example, a telephone number might be stored in a field called "TELNO" which is 13 characters in length. Thus the field will accommodate the number (610)555-5555.

RECORD—a set of fields. A record may contain, for example, a name, a telephone number, and a date. The "structure" of such a record might be: NAME, TELNO, DATE with respective field lengths of 30, 13, and 8 characters.

FILE or DATABASE FILE or just DATABASE—a group of records with the same field structure. To continue the example, all records in a database contain a NAME, TELNO, and DATE field. The field length for the same field in all records is the same, thus the length of all records is equal. In this case, the record length is the sum of the lengths of the individual fields: 30+13+8=51.

ASSEMBLY LANGUAGE—a symbolic language using mnemonics to specify machine operations and consisting of letters or strings of letters. Assembly language is a very compact language in terms of storage space and processing time but cumbersome to use because of its one-to-one relationship with machine code instructions.

MASS MEMORY—The peripheral, long-term, static or storage memory of a digital electronic computer in which original data is stored for later use in processing. May comprise magnetic recording disks, tapes or other means on which a more or less permanent record may be recorded for later retrieval.

WORKING MEMORY—The internal electronic active memory of a digital electronic computer in which data is temporarily recorded and held for processing as well as processed in accordance with the directions of a computer program.

SUMMARY OF THE INVENTION

The present inventor has unexpectedly discovered that the sorting function of database management systems can be very considerably speeded up by using a combination of means and factors including, particularly in dBASE systems, the use of assembly language rather than the normal database management language to control the sorting, and even more importantly, the use of a unique set of buffers, queues and elevator stacks to bring as many consecutive records from the database in mass memory into the available memory of the CPU as possible in order to streamline data flow and reduce the overhead of accessing the data. After as many records as possible are loaded into the working memory, the entire file is processed or sorted, seeking the pertinent data desired which pertinent data is then held in the working memory while the primary series of records is returned to the storage memory, or, since it usually continues to be held in the storage memory, is in actuality merely erased from the working memory except for the selected data which is being retained. Since transfer time from the storage memory to working memory takes a significant interval, considerable time can be saved in processing the data by minimizing the number of individual transfers of data. Little, if any, time is used in going from one record to another in the working memory. Consequently, the time saved in accordance with the present invention is in large part the difference in processing time in selecting and transferring a single record from mass storage or peripheral memory to active or working memory, processing such record and then, in effect, transferring it back to storage memory and bringing the next record into working memory as has been customary in the prior art, compared to bringing a plurality of records into working memory as a unitary mass of data or consecutive records and then continuously processing such records consecutively without interruption for transfer between mass storage and working memory.

In order to implement the operation of the system of the invention, there is provided, in accordance with the invention, an external utility or external program that reads the database of the data management system in a sequential fashion into large memory buffers for processing. The buffering is accomplished by two buffers: the primary buffer and the Virtual Record Storage Buffer (VRSB). The OS is instructed to read large blocks of the file, and thus large numbers of records at a single time, into the primary buffer. Once in the primary buffer, the data is transferred by the external program of the invention to the larger VRSB. After several reads and transfers, the VRSB is filled and contains a mirror image of the contents of the file. This memory is then manipulated and eventually processed. The primary buffer is also used to buffer the output that is to be written to the file. This second buffering provides the same reduction of OS overhead as eliminated by buffering the reading of the file. The memory buffers are especially opened in accordance with the invention to provide space within the working memory to operate the external utility of the invention. Thus in accordance with the invention, there is opened a new file in the working memory to contain the records of the database where such records are accessed for processing, usually by the conventional code or program. The intermediate code of the external program or utility determines the optimal amount of working memory which can be used for the new file and then selects consecutive records for inclusion in such new file which can be referred to as a virtual record storage buffer or file. The normal or usual program code to process the selected records may then be used for such processing. The external program or utility of the invention is therefore designed to:

(1) determine how much storage capacity is available in the working memory, (2) use a formula or other calculation to determine how much working memory must be preserved for the processing functions of the system, (3) set up a primary buffer or temporary memory storage area in the working memory together with a temporary virtual record storage buffer (VRSB). The primary buffer is a vehicle in many systems for transferring records to the VRSB which is a larger memory facility. The primary buffer may desirably provide about 40 kb of memory and the VRSB may desirably contain up to 500 Kb of memory storage capacity. The exact amount of memory will vary, however, and the only strict requirement is that the VRSB shall be larger than the primary storage buffer.

(4) the records in the database file (DBF) are transferred sequentially into the primary buffer (PB) to the capacity of such buffer and are then read or transferred sequentially into the VRSB. This is done as many times as necessary, stacking the content of successive primary buffer loads up in the VRSB until the entire content of the database, or as much as there is storage room for, is transferred or stacked in the VRSB. At this point the VRSB contains a virtual or mirror image of a large portion at least of the database records.

(5) once the VRSB is filled by repeated reads and transfers from the primary buffer, which buffer has in turn received the records from the original database file, a record selection routine in the external utility or program tests each record now in the VRSB against the data template selected by the user. Any records that meet the preselected criteria are processed by the external utility as requested by the user and transferred into the primary buffer (which is now empty or at least available, since its original contents were duplicated in the VRSB) for transfer to another location by the user.

The execution time of the arrangement of the invention is from four to as much as twenty times as fast as conventional equivalent functional programs as the result of decreasing the selection overhead loss due to bypassing of multiple consecutive selections by the program of the invention.

BRIEF DESCRIPTION OF THE DRAWINGS

FIG. 3 is a diagrammatic indication of a typical database in a program such as dBASE III or the like.

FIG. 5 is a functional flow sheet-type diagram outlining additional preferred operating steps in the method of the invention.

FIG. 6 is a diagrammatic representation of the creation of a virtual record storage buffer in accordance with the procedure of the invention for later processing in accordance with the procedure of the main database management program plus subsequent processing.

DESCRIPTION OF THE PREFERRED EMBODIMENT

Figure 1:
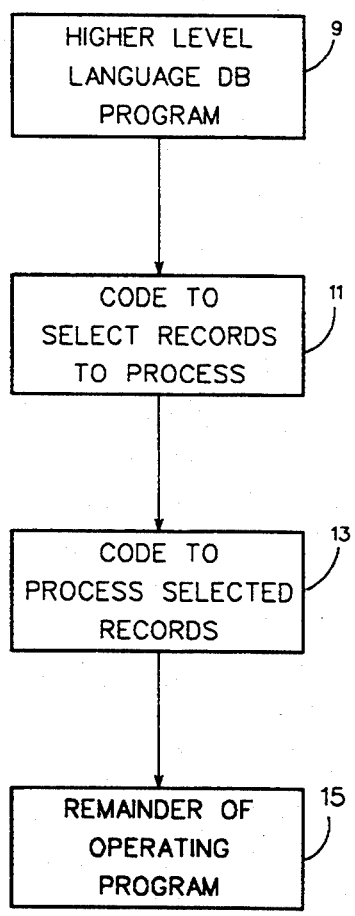
FIG. 1 is a functional flow sheet-type diagram outlining the initial operating stages in a representative database management program (prior art).

The present invention enables the execution portion of a high level language database management system to operate at a very much higher rate of speed than was heretofore possible and, in fact, usually from four to twenty times faster than similar programs. This often enables data to be processed in a matter of minutes rather than hours as was the prior situation. The new system is in the nature of an add-on or, in a sense, a subroutine or alternative selection subroutine grafted onto the principal database management system with which it is used. In terms of art, therefore, it is an external utility or program. The nature and operation of the system or program will be evident from the appended drawings in conjunction with the following description and explanation.

Database management systems are essentially computer programs especially designed to expeditiously and expediently handle record-type or file-type information in large quantities. Typically such information is in the form of lists of substantially similar information such as names and addresses, accounts and the like. It is important that such information be readily retrievable by some indexing means such as the last name of persons listed in such information or the like. With a good database management system, the various files should be reviewable to match up any bit of information contained in one or more records with a preselected template query. In other words, a good system will enable the user to set up definitions or queries such as all records containing the name "Smith", or all records containing the age "59" or any other desired bit of information. The system will then sort through the records looking for such information or, in effect, matching the file information against the query information or template to find any which corresponds. The usual procedure is for the system to read each record of a file into the working memory of a central processing unit (CPU) where it is then in effect, read over by the CPU and compared bit by bit or item by item with the predetermined query. If matching information is found, it is recorded in some manner, either in part or as a whole, and the record is either returned to long term or mass memory or more likely, since data is usually withdrawn from the long term mass memory without erasing or otherwise affecting such memory, is merely erased from the working memory and the next record is withdrawn from permanent or mass memory and entered into working memory for processing. Although the processing of the file information record by record is accomplished by the usual CPU in a fraction of a second, progressing through a large number of individual records can take a very significant period of time which is expensive not only in operator and machine time, but also prevents the CPU from other uses including networking with other computers. Very long files may require so much processing time that they can be run only in off-hours when the CPU is not likely to be used for other activities. The present invention is able to speed up processing of such file information dramatically by a new combination of processing steps that can be switched into operation when expeditious processing is desired. As indicated above, such processing steps comprise a determination of the amount of free or unused memory storage capacity which is available in the working memory of the CPU while still leaving sufficient additional free memory to run the program. The subprogram then selects a number of records from the files of the static memory elements, preferably sorting such records initially to pick out only the pertinent ones and even more preferably, only the pertinent information which it is desired to process. For example, if it is desired to find all those accounts where the recordee is 59 years old, only those records which contain age data are selected and, if it is desired to only know the names of such recordees, only the age recorded information and the accompanying information is selected. The external program of the invention, which is written in assembly language for speed, then selects a number of the sequential records and creates a new copy or duplicate of those sequential records just long enough to be accommodated in the predetermined available working memory of the CPU and the records are then read into the working memory as a unit of file information. This duplicated portion of file data is then processed in the normal manner by the principal processing system of the CPU to extract whatever information is desired. After such processing, the external or subprogram of the invention selects another set or series of records if there are any additional, and reads these into the reserved portion of the working memory of the CPU, which memory has, of course, been cleared of the initial file information. This file data is then processed in the normal manner. This procedure is continued until all the primary file information has been sorted or processed.

If the external or subprogram of the invention does not, as is preferred, first select the most pertinent information from the records, it will instead merely read into the working memory the number of records from the main file which have been predetermined to be accommodatable in the working memory of the CPU. The plurality of records read into the working memory will then be processed. The usual or prior art reading of individual records into the memory and processing them one by one is very time consuming because of the selection process which must take place for each record. Selecting a series of consecutive records requires only one selection step to be made for each series of records and in this manner substantially eliminates this time-consuming process, thereby saving an unexpectedly significant amount of time.

In describing the operation of the system of the invention, the definitions provided above under the heading "Terminology Conventions" will be adhered to. Further details and advantages of the system of the invention will become evident from review of the attached drawings in light of the accompanying description and explanation.

FIG. 1 is a diagrammatic flow sheet illustration of the broad functional steps in the usual database management system. As such, FIG. 1 illustrates the type of prior art system with which the present invention can be used as an add-on or subprogram or system. In FIG. 1, a higher level language database management program 9 includes a code system 11 to select records to process. It also includes a code system 13 to process the selected records plus the remainder of the operating program 15 where whatever is to be done with the processed data is accomplished.

Figure 2:
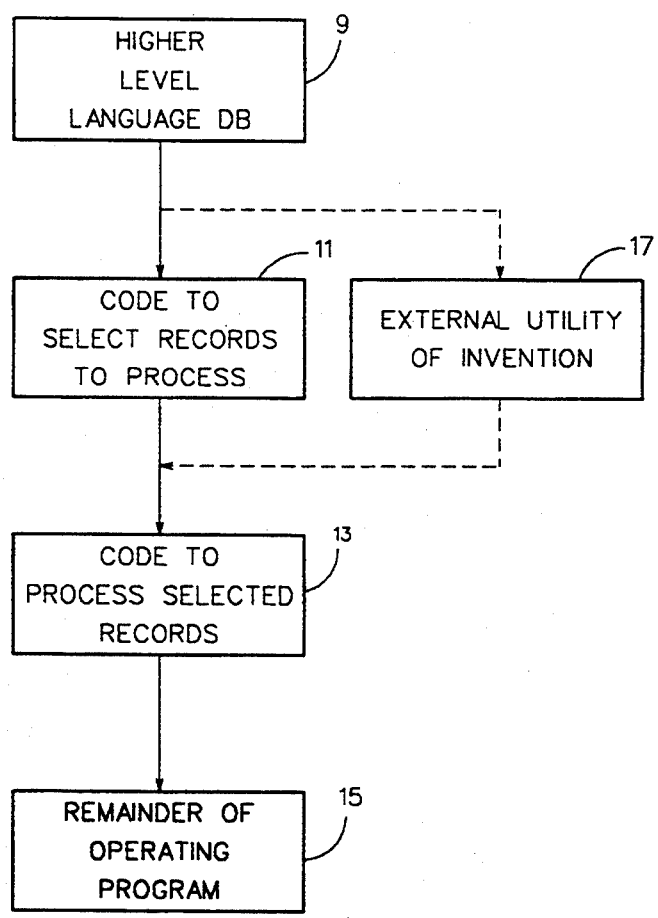
FIG. 2 is a functional flow sheet-type diagram showing how the program of the invention may be substituted for the selection code section of prior art database management systems such as shown in FIG. 1.

FIG. 2 is a diagrammatic flow sheet illustration of the broad functional steps as illustrated in FIG. 1 with the subprogram or external utility of the invention 17 added to by-pass, when desired, the code to select records 11. In other words, as shown, the data base management system of FIG. 1 is modified so it can use either the already supplied code to select records to process 11 or use the code 17 of the invention to replace the usual code 11. The same reference numerals are used in FIGS. 1 and 2 to refer to the same flowsheet steps.

Figure 3:
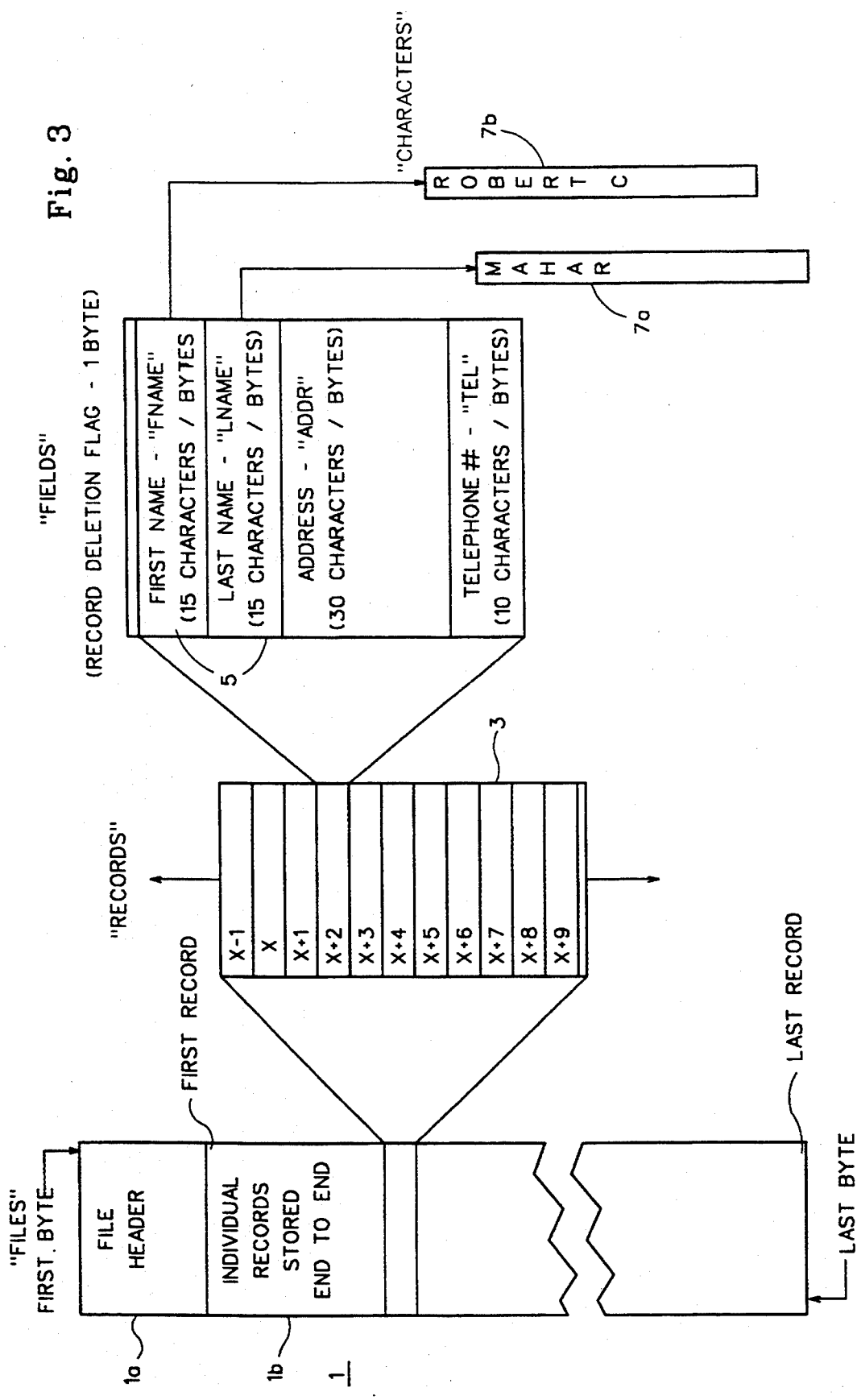

FIG. 3 is a diagrammatic indication or pictorialization of the structure of a typical database, in this case a dBASE III database supplied by the Ashton-Tate Company. To the left is shown a file or files designated by the numerical reference 1. A so-called "file header" 1a at the head of the file contains coded information on the size and number of records in the file plus the field names for the fields in the individual records. After the file header there are a series 1b of consecutive individual records 3 containing all of the data recorded and available for processing. Individual records 3 are shown broken out or enlarged from the file to the right of the file. For convenience, each record is designated in the system as x, x+1, x−1 or the like for reference by the system. The individual records 3 contain so-called "fields" 5 in which information of various characteristics is recorded. One record 3 is shown broken out of the series of records and enlarged to the right to show typical fields. Within the fields there is a further subdivision in the form of "characters" 7 which may be individual elements of information, in this case, as shown to the right of the fields 5 and broken out therefrom, individual names 1a and 1b contained in the field.

Figure 4:
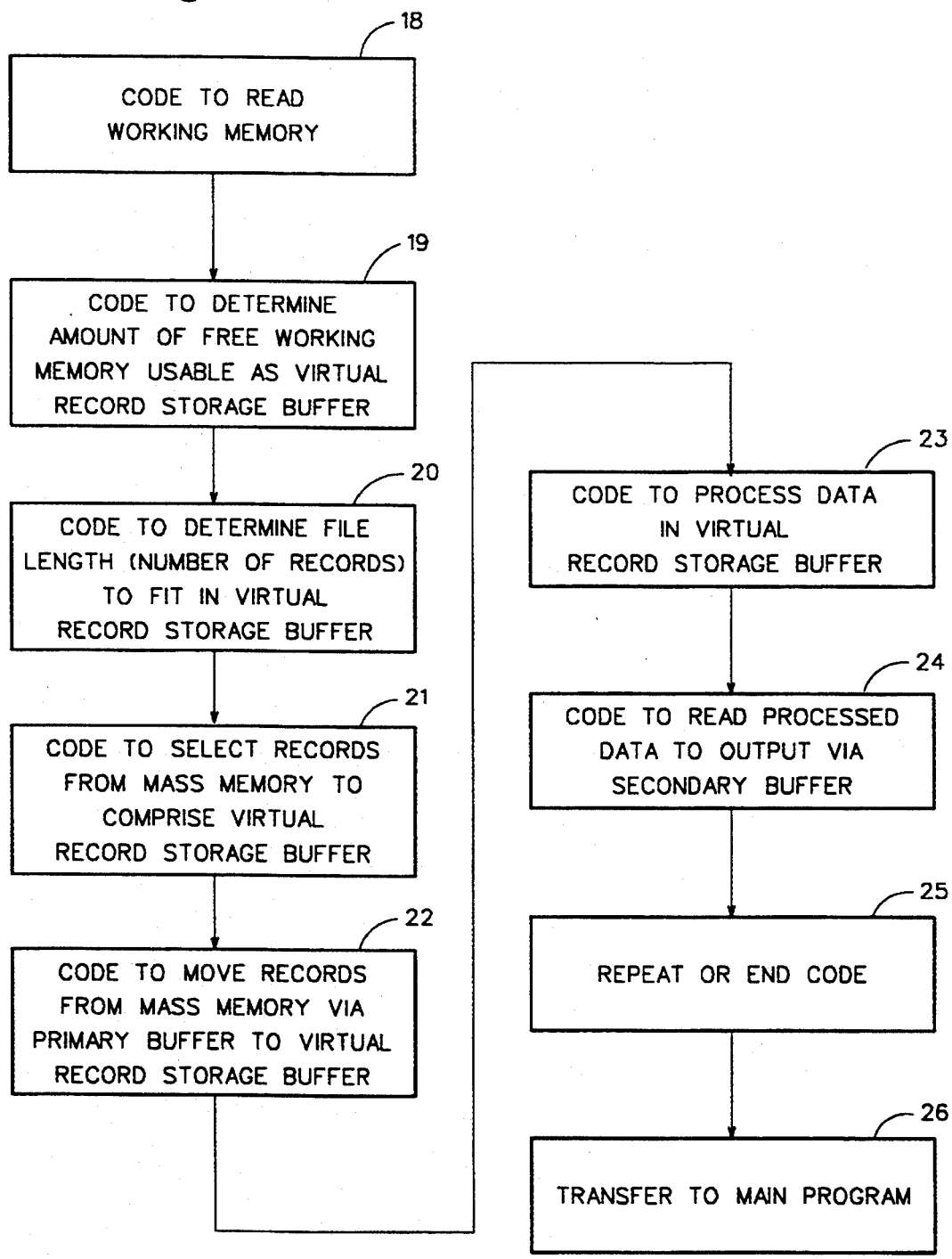
FIG. 4 is a functional flow sheet-type diagram outlining the essential operating steps in the program or method of the invention.

FIG. 4 is a diagrammatic flow sheet-type illustration of the individual system components of the database selection acceleration code system of the invention illustrating the essential functional steps in the basic program or system of the invention. In accordance with the invention, such program first reads the working memory in the functional step 18 to determine the amount of unused memory. The program then determines in step 19 the amount of free-working memory which can be used as a virtual record storage buffer while allowing sufficient memory to remain free to accomplish the remainder of functions of the main program. A functional step 20 then selects the file length or number of records which will fill the available working memory. The next functional step comprises the selection of records from the storage memory to comprise the virtual record storage buffer content and transferring them to the virtual record storage buffer where they can be processed in accordance with the remainder of the program. This functional step is designated in FIG. 4 by the reference numeral 21. A functional step 22 then moves or transfers the selected records from the mass memory via in most cases a primary buffer to the virtual record storage buffer. The primary buffer, which is located in working memory, is desirably used in most computers, but in some cases may be unnecessary and in such case the records can be transferred directly from the mass storage to the larger virtual record storage buffer in the working memory. The primary buffer, when used, takes uniform batches or groups of records, usually about 40 Kb worth, from the mass memory and transfers them consecutively into the virtual record storage buffer (VRSB) in working memory where they are in effect stacked up until the VRSB is completely filled.

After the VRSB is completely filled, the next functional step 23 will process the records in the VRSB in any of the modes or menus that may be provided in the program. The processed data is then read to output via a secondary buffer in functional step 24. The secondary buffer will in almost every case be the same buffer memory area in working memory as the primary buffer, although it is possible to have the two separate. However, assuming a primary buffer is present, it is much preferred that it also serve as the secondary buffer when the output mode is functioning, since the primary buffer is effectively empty during the output mode. After the readout of the processed data from the VRSB is accomplished in functional step 24, a further functional step 25 repeats the sequence if there is additional data in mass storage for processing, or, if not, ends the external utility operation in which case control is returned to the main program such as a dBASE III program in functional step 26. From step 26 the data processing then continues as shown in FIG. 2.

FIG. 5 is a further diagrammatic functional flow sheet-type indication of a preferred or improved operation of the functional process included in block 25 of FIG. 4.

In FIG. 5 the individual records, which, as shown in FIG. 4, are merely selected and passed or copied bodily into the virtual record storage buffer in the steps indicated by the reference numerals 21 and 22, are, instead, after selection in functional step 28, preliminarily processed as they are read into the working memory to preselect only the pertinent information from the records to reproduce in the virtual records. This is indicated by the functional block indicated by reference numeral 27. This step decreases the amount of recorded data which is transferred to the virtual record storage step. This has two benefits, (a) the amount of data transferred into the working memory is decreased so it takes up less of the working storage, and (b) there is a preliminary presorting or processing of the records so that there is ultimately less for later processing, thus increasing the efficiency of such later processing. The main advantage, so far as increasing the speed of the program is concerned, is the gain in working storage capacity by inserting less data into it. This allows, in a preferred embodiment of the program of the invention, an update of the number of files to be transferred so that more total records with less total data can be copied into the working memory for active processing, allowing such processing to be more quickly accomplished on the same number of files and, even more importantly, decreasing the total number of individual selecting operations which are necessary to transfer the total file records into working memory for processing. As will be understood, the preprocessing step does not significantly, if at all, slow down the transfer of the record data because it is accomplished while the data is being transferred on a broad basis and does not require any actual selection routine. In other words, all the record files are automatically transferred, but some of the information in the file may not be written into the virtual record storage buffer because it is automatically deleted either because the program is set to copy data only from certain portions of the memory field, or because an actual broad comparison of the data is made with a predetermined data template during the transfer or read out of the data.

In a preferred version of the invention, toward the end of the copying of the record data into the virtual record storage buffer, the control again determines how much room remains in the working memory as a result of the decrease in the record data read into the virtual record storage buffer and the number of records which can be read into the data is readjusted. This can, depending upon how much the data is abbreviated, result in significantly more room for final record content in the working memory. This functional step is diagrammatically shown in FIG. 5 by the block designated 29. The last preferred functional step is then to select additional records from the file for inclusion in the virtual record storage buffer and to continue to read into working memory such records, meanwhile preferably preprocessing them for the most pertinent data. This is illustrated in FIG. 4 by the block designated 31. The read in of the files is terminated when the recalculated number of files has been read into the virtual record storage buffer.

The records read into the VRSB are next processed in the VRSB 23a and the output to the data file is buffered by being first transferred to the primary buffer which at this point is available for use as the secondary buffer since all records have been transferred to the VRSB. The improved or preferred version of the program of the invention is useful mainly for computers that may not have very large working memory or in special situations. Most recent modern computers, however, have a large amount of working memory that seldom is used because of other constrictions such as the structure of the program systems available. Consequently, in most cases the basic system of the invention is quite sufficient to effectively speed up and process the database.

After the recalculated number of records is read into the virtual storage record buffer and then passed via the primary, or secondary, buffer to output, the subprogram or external utility of the invention either preliminarily performs preselected routines or processing steps on the records or returns system control to the main program and the individual, but in many cases abbreviated, records are processed in accordance with the main program. This rapid processing without intermediate selection of additional records can be accomplished at, at least, several times the rate which would be possible with intervening or intermediate selection of records for processing. When the processing of the records in the virtual record storage buffer is completed, control is shifted back to the subprogram of the invention in the normal manner which erases the data in the virtual record storage buffer and, if there are additional records in the long-term storage files, repeats the steps above, selecting and reading an additional group of records into the virtual record storage buffer while preferably processing such records for the most pertinent data.

FIG. 6 is a diagrammatic pictorialization of a system typical of the the outlines of the system or process of the invention as generally described above. At the left is shown a file of data records 35 for processing. These files will be understood to contain megabytes of data or records for processing. A small portion of such records is symbolically broken out and shown to the left as 36 as an illustration of the records contained in the database file 35. A file pointer 37 identifies or monitors the position in the file from which records are being read.

A series of 40,000 kilobytes of records is shown to the right of the file 35 held in a primary buffer 39 in the working memory of the computer to which buffer it has been transferred or read from the database 35 in mass storage. This 40,000 kilobytes of records is read from the primary buffer 39 into a virtual record storage buffer (VRSB) section 43 of the working memory which, in the case in point, can be considered to have available at least 64 kilobytes (64 kb) of memory for storage of the records and can desirably have up to 500 KB of available memory. Once the records are entered into the VRSB 43, control can be returned to the primary program which then processes the record information in the normal manner. However, usually the records in the VRSB will be processed by the external utility of the invention in accordance with the record selection tests 47 for certain data and will then be placed in the secondary buffer 49 for transfer to the operating system. While the secondary buffer is indicated as "secondary" because it is the second 40 KB buffer used in the system of the invention and could, in fact, be separate from the primary buffer in the working memory, in the preferred embodiment of the invention, the secondary will actually be the primary buffer 39 used again. It is enabled to be used again to buffer the output because when the output is buffered all records have already been transferred from the database to the virtual records storage buffer and the primary buffer is effectively empty.

It will be understood that FIG. 6 only shows the broad outlines of the system of the invention and not the preferred refinements or further refinements illustrated more particularly in FIG. 5.

The broad outlines of the construction and operation of the external utility of the invention has been presented above in connection with the appended drawings and diagrams. To better enable one skilled in the art prepare to program or use a similar system, the following general system outline is presented with additional detail.

Speed of processing is obtained in the external utility or program of the invention as pointed out above in part by the use of assembly langauge. Assembly language is available on all computers and is used primarily as the medium or language for instructing the microprocessor or operating system of the computer.

On average, many microcomputers can process one million "machine instructions" per second, some can process even more. Each machine instruction is a single assembly language instruction. The full implementation of the external utilty of the invention may require in the neighborhood of 5500 instructions. Many of these, however, represent the same basic theme repeated with variation. A main reason assembly language is not commonly used is that it is difficult to program in (as opposed to the BASIC or Pascal languages, for example, which are considerably easier to use in relative terms). However, the benefits of assembly language where speed is important far outweigh the difficulties or disadvantages. In all implementations of the system of the invention, therefore, it is recommended that assembly language be used, but it is not necessary for success. A system written in the COBOL language is usually so slow that almost any language (except COBOL of course) can be used to gain speed. But the use of assembly language alone will not provide much of an advantage. Something more must be done.

The next factor that is addressed by the basic design of the system of the invention is Operating System (OS) overhead. The operating system is a set of standard routines, more-or-less built into the computer, that are accessible by the programmer. These routines provide the programmer with a standard "environment" to work in, such that his program can be used on all computers that use the same operating system. This allows for compatibility between systems with different hardware, storage devices, video displays, etc. But the OS does exact a price. There is a specific time used by the OS to perform its various functions. For example, it may take a minimum of 20 microseconds to write a display to the screen. This means that to display even a single character to the screen takes 20 microseconds. So if one were to display 100 characters to the screen, each character could be displayed one at a time with separate calls to the OS for each. This would take 20 microseconds times 100 characters, or 2000 microseconds. However, most computer's OS or operating systems can display an entire group of characters under one request. This will waste only 20 microseconds instead of 2000.

The external utility or system of the invention cuts OS overhead to a minimum. The database is read in a sequential fashion into large memory buffers for processing. The buffering is accomplished by two buffers: the primary buffer and the VRSB (Virtual Record Storage Buffer). The OS is instructed to read large blocks of the file, thus large numbers of records at a single time, into the primary buffer. Once in the primary buffer, the data is transferred to the still larger VRSB. After several reads and transfers, the VRSB is filled and at this juncture contains a mirror image of the contents of the file. It is this working memory file that is manipulated and eventually processed. The primary buffer is also used to buffer the output that is to be written to the output file. This provides the same reduction of OS overhead as is eliminated by buffering the reading of the database file.

In summary, the present inventor has discovered that the processing speed of random access files can be greatly increased by utilizing a combination of assembly langauge and the buffering system already described. The buffering system, in effect, allows sequential access to random access files and this allows a drastic decrease in OS overhead, a drastic increase in processing speed, and an easily implemented way of speeding file processing.

Though the processes described need not apply to the dBASE III language or to the use of the IBM PC series of computers, one embodiment of the external utility of the invention designed for use with dBASE III on IBM PC computers or substantial clones of such computers will be used to provide an insightful example of the practical application of the process of the invention.

This particular embodiment of the invention will be referred to as the dBDO utility or dBDO for short.

The dBDO utility was developed to increase the processing speed on certain large databases (in the order of 60,000 records) on an IBM "XT" style machine. The state-of-the-art database manager system, "dBASE III" by Ashton-Tate, took hours to process such files. Therefore, dBDO had to provide drastic increases in speed, had to be compatible with dBASE III, and had to be easy to use. All three criteria were satisfied by the development of the dBDO utility in accordance with the present invention.

Assembly language was used in dBDO to attain flexibility and speed. In this case, no other language could be used to implement the buffer systems. dBDO uses the two-buffer system described earlier. The primary buffer was designed to be 40,000 characters in length and the VRSB was a minimum of 64 kb in size. The program had a parsing routine which translated the user's commands into something the machine could understand. The syntax was made similar to dBASE III so that dBDO would not be difficult to learn for a programmer familiar with dBASE language.

The first step in making dBDO was the creation of support routines. These routines allow dBDO to perform screen display, opening files, and similar basic functions. Basic OS routines were redesigned such that they are easier to use. For example, the call to display a single character to the screen requires that 7 registers be set in dBASE III program. So a "Character Display Routine" was created to handle all the garbage work associated with screen display with one instruction.

The basic file handling routines, however, required more finesse. dBDO employs file blocks, or sets of parameters for each file it uses. These file blocks indicate the number of records, fields per record, characters per field, and the number of records that can fit into the primary buffer and the VRSB. These values are maintained by the routine that processes the files. The files are opened and the pertinent information is read in. Upon the closing of a file, the information in the table is used to update the corresponding values in the file.

After the basic support routines are written and tested, the more specific routines must be prepared. These comprise error handling, environment checks, and basic memory management. The error handling routines in dBDO consists of a table of error messages of equal lengths. There is an error number assigned to each message determined by the position of the error message in the table. The error routine is given the error code by the part of the program that caught the error. The error routine displays the error message and sets flags that indicate an error occurred. The program eventually aborts after files are closed. The error messages are large enough to accommodate a precise description of what happened and possible solutions to the problem. The error routine does not end the program itself.

Control returns to the part of the program where the error was generated. This allows that part of the program to take the necessary corrective action based upon the type of error. There are several "break points" located throughout the sequence of processing that detect if an error has occurred somewhere upstream. This allows dBDO to list problems it encounters all at once. If this were not done, the user might fix one problem just to have the program point out another, this way all problems are given at once and can be fixed in one shot. The break points determine if the severity of the error warrants an abort or if processing can continue. The system is set up so that the program executes as far as it can before the errors are no longer tolerable. In no case will the program allow a serious error to go unreported. Nor will the program allow files to be opened when errors are pending. In most cases the files are not even opened if errors occur, so no chance of file corruption can occur.

Errors are divided into two categories: "DOS errors" and "dBDO errors". DOS errors are those that DOS (Disk Operating System) reports. These errors generally relate to hardware errors and errors encountered by the computer when accessing the files. Errors of this nature are not under dBDO's control. dBDO errors are those associated with actually processing the request the user has made. For example: syntax errors, incorrect field names, networking errors. These errors usually describe problems the user has inflicted upon himself. But regardless of the type of error, the error code is returned by a special status file written to mass storage. This error-file is accessible from the calling application program (usually dBASE or a compiled application).

The next important routine to write is the environment check routine. This routine is used to compute how much memory is available, confirm the version of DOS being used, and check other similarly important information. The purpose is to make certain that the program will be able to run without error. For example, dBDO checks to see that 64K of memory is available after the program is loaded. Then the routine continues to check the DOS version. If the computer is using too antiquated a version of DOS, the program will crash later on. If all criteria are not met, then the error routine is called to report the error.

After the system checks out, then one must "allocate" memory to be used. For the IBM PC's MS-DOS, all memory is allocated for the program loaded in. This presents a problem since if one asks the computer "How much memory is available and where does it start?", the computer politely says, "No memory is free since you already have it all available." In order to avoid the difficulty, the starting point of the program's location in memory is determined (from the PSP, cf Norton Guide). Then the DOS is instructed to release all the memory after the program. This is done by making a "Modify Memory Allocation" call to DOS, which is instructed to change the amount of allocated memory to the length of the desired program.

The above procedure will free up the memory not used to hold the operating program. Now if one asks, "How much memory is available and where is it?", the computer responds with the correct answer. Now one can reserve the amount of additional memory needed to hold the VRSB. dBDO uses a minimum (or default) of 64 kb. The program can use all of the available memory, sometimes upward of 500 kb, if the user requests. But the use of all memory displaces the DOS command processor.

Once the initial subroutines are completed and tested, more specialized routines direct the processing of data. This process encompasses several major parts which should be developed in sequence to avoid programming problems later. The systems that should be developed next are routines to: open and close database files, read the contents of the database into the VRSB, select records, process selected records.

It is advisable that these routines be "loosely connected". This meaning that changes to one routine do not require major revision to the rest of the routines that the modified routine is related to. This allows easy upgrade and testing; and dBDO uses a loose connective structure for these reasons. In this way, the end result of the program is a "collective effort" of all the subroutines. Any subroutine has a specific function; provided with a set of data, the routine will act in a predetermined way, thus the method of achieving the goal can be completely changed without affecting the rest of the program.

Though different databases have differing file structures respecting the order in which the data is stored, most databases contain the same basic information. This information must be elicited from the database file stored on mass storage. The pertinent information is usually: the number of records in the database, the number of fields per record, and the "name" and size of each field. This information is usually stored in a "file header". This header, as the name implies, lies at the beginning of the database file, preceeding the actual records maintained in the file. Such a file header exists in the structure of dBASE III databases. Other database systems have a separate file that contains this information.

In either case, registers or variables are set up within the program to keep track of this information. All routines that use file data update these registers such that, at any time, the registers assigned reflect the actual status of the file on mass storage. If the program were to add ten records to a database, the program would also update the registers assigned to keeping track of the number of records.

Upon opening the file, the file header is read. Normally, the file header has a distinctive "fingerprint" to identify it as a database. This allows the program to verify the fact that it is accessing a database and not a wordprocessor file containing a resume or some other such inappropriate data. If the header fingerprint checks out, then the informational part of the header is placed in the corresponding registers in the CPU's memory.

When the program is done processing a file, the file must be "closed" to preserve the safety and validity of the contents of the file stored on mass storage. When the file is closed and if changes are to be, or have been, made to the file on mass storage, it is necessary to update the file header on the mass storage itself since the data is not automatically updated on mass storage. A routine must be constructed that is the converse of the Open File procedure such that the header information is written back to mass storage.

The next routines necessary, once files can be opened, are routines to retrieve data from mass storage and place it in the VRSB. This process can be accomplished by two methods, depending upon the abilities of the computer and the operating system used. There are several routines in addition to a main routine that actually transfers the data. The number of records that will fit into the 40K or primary buffer and the number of records that will fit into the VRSB must be calculated. The calculations are straight-forward: divide the length of the buffer by the number of characters per record (found in the file header information).

The problem of reading the file into the VRSB is divided into three parts: (1) read numerous records into the primary buffer, (2) then relocate the data into the VRSB, (3) control the number of repetitions of 1 and 2 such that it fills the VRSB. The necessity to read the file information into a buffer prior to transfer to the VRSB is a computer imposed limitation. On systems that allow reading of file data directly into any location of memory, steps 1 and 2 may not be required. However, the overall effect is the same whether the records of the file are read directly to the VRSB or initially to a primary buffer from which they are then read to the VRSB. the VRSB is filled to capacity by the contents of the file.

The net result is a routine which, when called, will fill the VRSB completely if possible. If this is not possible, such as when the database is smaller than the VRSB capacity or the end of the database is being approached, the VRSB is partially filled and some indicator shows the quantity of records read. In practice, the routine will be called over and over until all records in the database have been read. Between these calls is the point where the processing of the file takes place.

dBDO keeps or maintains registers that show the status of the VRSB and indicate (a) the number of records now in the VRSB, and (b) the number of records that could fit into the VRSB. If these two numbers are not equal, then the last pass over of the database has exhausted the records yet unprocessed. If the numbers are equivalent, then another cycle of filling up or stacking records in the VRSB is necessary.

dBDO also maintains registers that indicate the number of records already processed and the total number that are in the database. These can also serve as a means to determine if another Read Cycle is necessary. Normally this information is not used for such purposes since it is harder to directly determine if a full VRSB is present.

Generally, a Read Cycle is composed of possibly several smaller reads from the database such that the VRSB contains the maximum number of records allowable. Since the database can be much larger than the VRSB, multiple Read Cycles or passes are normally necessasry to process the entire file. All steps in the process lead to retrieving the maximum number of records from mass storage at one time or in one "request" to the operating system. This buffering system alone accounts for a good portion of the enhancement in speed over the prior art.

Once in the VRSB, the records can be processed in accordance with the user's wishes. The methods of selection, allow the user to selectively ignore certain records that do not meet the selection criteria. For example, an accountant may want all ledger entries for a certain client number. He may choose all records where the CLIENT field contains a predetermined value. The major programming difficulties occur in implementing a fast and efficient system to check the record against the template the user has given. However, whatever method is used will benefit from the sequential checking in memory (the VRSB) of record contents.

dBDO uses a combination of tokenization schemes and efficient programming techniques that may be hard for programmers to implement on their specific system. Thus it is irrelevant to discuss such matters here as they extend past the scope of the present invention. The following will outline the selection process and set the stage for processing of the selected records.

As mentioned briefly in the beginning, the programmer must provide routines to convert the user's human readable instructions into something the program can act upon. dBDO uses a tokenization scheme by which certain keywords are recognized. Each keyword has a specific meaning. dBDO recognizes the word "FOR" to indicate selection criteria. Such as:

FOR FIRSTNAME="BOB" & LASTNAME="SMITH". The phrase above is translated by dBDO to mean: examine the records and select those where the field FIRSTNAME is equal to "BOB" and the field LASTNAME is equal to "SMITH". The tokenization scheme reduces keywords to a sequence of numbers. This particular phrase contains 4 keywords: "FOR", =, &, and =. After much manipulation, the tokens will be in an easily processed form. The selection routine sequences through the selection tokens and performs the necessary comparisions or unitary logic. This part of the program can be anything the programmmer wishes as long as he can find an efficient way to expedite the comparisons.

Some routine is necessary to cycle through the VRSB and have it say to itself, "Is this record selected, i.e. meets the criteria, and if so what shall be done with it?" These routines are the so-called "Function Routines" as there is one such routine for each database management function that dBDO is capable of. These routines contain process-specific programming to allow dBDO to perform over ten separate functions. Each of these routines has the responsibility of calling the Read Cycle routine to access the database. Also, the function routine calls the selection routines which return a "Yes" or "No" verdict as to the selection status of the record being examined.

Depending upon the function selected by the user, dBDO may be required to process the selected records further. Examples include: display of selected records, copying selected records to a new database file, replacing certain field contents with new information, etc. If such processing includes updating a database file, an additional routine is required to handle the process.

As part of the plan to reduce OS overhead, it is also very important to buffer the OUTPUT to a datafile. This reduces the number of writes made to the storage devices and thus reduces time wasted, as it conserves time for reading the information. This routine disirably uses the same 40 kb buffer used to read the file. However, if, as indicated above, no primary buffer is used or necessary, a separate or special buffer will be required to be set up in working memory. Alternately, two separate buffers can be used for the primary buffer and the "secondary" buffer. Since the contents of the primary buffer is not needed after the VRSB is filled, the 40 kb space becomes available for use as an output buffer. dBDO uses two routines to write records, both place the contents to be written into the buffer. When the buffer is filled it is written all at once to the output file. If the program has a need to use the buffer for other purposes (such as replenishing the VRSB) the program forces the buffer to dump its contents to the output file if it is filled or not.

The following are general specifications for some of the more important routines provided in the dBDO external utility of the invention. Other routine specifications can be constructed as necessary from the information and discussion presented above.

(a) OPEN FILE ROUTINE
  (A) "open" the file using DOS function calls
  (B) read and process the file header
    (1) position the file pointer VIA DOS function calls to the location of the file header.
    (2) read the file header into a buffer, the primary or 40K buffer was used for this purpose
  (C) place the information, now stored in the buffer, into the registers described previously
(b) CLOSE FILE ROUTINE
  (A) update the file by dumping partially filled buffers (which is described later). This is not necessary if no output file is used, i.e. to display data to screen
    (1) write an end of file marker if necessary (this is dependent upon the type of database operation being performed)
    (2) force the primary buffer contents to be dumped
  (B) update the file header
    (1) build a file header in memory from the registers maintained by dBDO
    (2) position the file pointer to the beginning of the file header
    (3) write the updated file header to the file on mass storage
    (4) close the file using DOS function call
(c) READ FILE CONTENTS INTO THE VRSB
  (A) check to see if the file was successfully opened
  (B) set counters that keep track of the number of records related to zero
  (C) attempt to read a predetermined number of records into the primary or 40K buffer (as many as will fit). Also check to see, by means of VRSB counters, how many will fit into the VRSB. If the number of record space in the VRSB is smaller than primary buffer then: only request DOS to provide that many records and NOT the maximum number.
    (1) read from the file into the 40K buffer by use of the DOS read from file function call
    (2) after DOS performs that operation, check the error code returned by DOS to see if the end of file has been hit
      (a) if the end of file is hit, check the number of records actually read vs. the number that should be in the file. If the values differ, the file is corrupt and an error should be generated
      (b) if the end of a file has NOT been hit, proceed to the next step
    (3) record the number of records read into the register for that purpose; additionally: update the other registers that indicate the total number of records read
    (4) transfer the contents of the primary buffer to the VRSB by using a microprocessor "MOVE STRING" command
      (a) transfer the buffer contents such that the data accrues in the VRSB in a continuous and linear fashion
      (b) the pointers and counters used to monitor the amount of data in the VRSB are used. These registers will indicate (either directly or by simple calculation) where the next 40K buffer is to be placed in the VRSB
      (c) use microprocessor or hardware facilities to move the large block of data around since it will be executed much more rapidly than any multi-instructional subroutine
  (D) repeat step (C) until the VRSB is completely filled
    (1) check to see if another 40K buffer full of data will fit, if so then repeat step (C)
    (2) if step (C) does not need to be repeated, proceed to the next step (E) exit from the routine after
  (1) there was an error in reading the file
  (2) the VRSB is filled with records
  (3) the VRSB is partially filled with records since no more records are left to be processed (d) MAINTAIN AND WRITE OUTPUT FROM PRIMARY BUFFER
  (A) copy data to output into the primary (40K) buffer
    (1) the function routine provides directly or otherwise the address or position of the data to write in system memory
    (2) the data transferred to the primary buffer
    (3) primary buffer pointers are updated
      (a) address of next available place in the buffer
      (b) number of bytes or characters on the buffer
      (c) number of bytes that can fit on the buffer
  (B) determine if the buffer is filled (and must be written)
    (1) compare the number of characters on the buffer with the number that can fit. If the numbers are similar, then the buffer is written to the output file as a single block of data (possibly containing a multitude of records)
    (2) if no need to dump the buffer to the mass storage, just return control to the function routine.

While the present invention has been illustrated and described in considerable detail in connection with the foregoing drawings and explanations of the various embodiments described, and has been described in particular with reference to use with dBASE database management systems, it will be understood by those skilled in the art, that the spirit of this invention can be implemented in other computer languages and the like without avoiding the intended scope of the claims appended hereto and it is consequently to be understood that the appended claims are not intended to be limited to the particulars of the various embodiments illustrated, but are to be broadly construed with reference to the language of the appended claims so as to provide the broadest possible interpretation of such claims in view of the prior art and thereby to effectively encompass the intended scope of the invention.

I claim:

1. A dynamic method of enhancing the data processing speed of a general purpose digital computer programmed with a data management digital computer program comprising the steps of:
  (a) storing for operation in a general purpose digital computer in combination with a data management program an external utility program arranged and constructed to designate, upon being called by an application program at the option of the operator, a large block of memory in the working memory of the general purpose digital computer available for processing data in said general purpose computer to serve as a virtual record storage buffer into which data records from relatively slower access mass storage means associated with said general purpose computer can be transferred,
  (b) determining through said external utility program an amount of total working memory sufficient to effectively operate said data management program,
  (c) selecting by use of said external utility a capacity of the designated block of memory serving as the virtual record storage buffer in the working memory of said computer sufficient to accept a plurality of data records from mass storage memory while maintaining sufficient undesignated memory in the working memory for processing within bounds determined automatically by the external utility of the data to be processed by the principal database processing section of said data management program,
  (d) reading by use of said external utility from the mass storage memory means into the virtual record storage buffer as much data in data record form as the virtual record storage buffer will hold,
  (e) at least partially processing said data in the virtual record storage buffer in sequential order by use of said external utility without movement of individual data being processed between mass storage memory and working memory whereby the speed of accessing and processing said data records is enhanced at least by a factor of four over that provided by the primary data management program operating alone,
  (f) passing the at least partially processed data from the external utility to the data management program for further handling, the external utility retaining processing control,
  (g) determining by use of said external utility if there is any data in mass storage memory remaining to be processed and in the event there is, repeating steps (d), (e), (f), and (g) as many times as necessary to process all such data until no data which is desired to be processed remains to be processed, and
  (h) returning processing control to the data management program by which any further processing is accomplished.

2. A dynamic method of enhancing the data processing speed of a general purpose digital computer programmed with a data management digital computer program in accordance with claim 1 wherein the programming language or source code of the external utility program is an inherently faster programming language than the language of the principal data base processing program.

3. A dynamic method of enhancing the data processing speed of a general purpose digital computer programmed with a data management digital computer program in accordance with claim 2, wherein the language of the external utility program is assembly language.

4. A dynamic method of enhancing the data processing speed of a general purpose digital computer programmed with a data management digital computer program in accordance with claim 2 wherein the data records are initially transferred from the mass record storage memory to a primary buffer established in the working memory of the general purpose computer and are then transferred to the virtual record storage buffer by the external utility program prior to processing.

5. A dynamic method of enhancing the data processing speed of a general purpose digital computer programmed with a data management digital computer program in accordance with claim 4 wherein the language of the external utility program is assembly language.

6. A method of enhancing data processing speed of a general purpose digital computer in accordance with claim 1 wherein the data is partially processed only for selection of data by the external utility before processing control is returned to said data management program.

7. A method of enhancing data processing speed of a general purpose digital computer in accordance with claim 1 wherein the data is processed beyond the selection of data by the external utility before processing control is returned to the data management program.

* * * * *